United States Patent [19]
Compadre et al.

[11] Patent Number: 5,855,940
[45] Date of Patent: Jan. 5, 1999

[54] METHOD FOR THE BROAD SPECTRUM PREVENTION AND REMOVAL OF MICROBIAL CONTAMINATION OF POULTRY AND MEAT PRODUCTS BY QUATERNARY AMMONIUM COMPOUNDS

[75] Inventors: Cesar Compadre; Philip Breen; Hamid Salari; E. Kim Fifer, all of Little Rock, Ark.; Danny Lattin, Brookings, S. Dak.; Mike Slavik, Springdale, Ark.; Yanbin Li, Fayetteville, Ark.

[73] Assignee: University of Arkansas, Little Rock, Ark.

[21] Appl. No.: 631,578

[22] Filed: Apr. 12, 1996

[51] Int. Cl.$^6$ ..................................................... A01N 43/40
[52] U.S. Cl. ............................................ 426/332; 426/335
[58] Field of Search .................................... 426/332, 532, 426/644

[56] References Cited

U.S. PATENT DOCUMENTS 2,756,647 7/1956 Thompson .............................. 162/161
5,366,983 11/1994 Lattin et al. ............................ 514/358

OTHER PUBLICATIONS

Harvey, S.C., Antimicrobial Drugs in Remington's *Pharmaceutical Sciences*, 18th Ed., Mack Publishing Co., pp. 1163–1241 1990.
Somers, E.B. et al., *Int. J. Food Microbiol.*, 22:269–276, 1994.
Breen et al., *J. Food Sciences*, 60:1991–1996, 1995.
Kim et al., *J. Infect. Dis.*, 170:1606–1609, 1994.
Ciosek et al., *Med. Weter.*, 40:335,338:1984. Chem. Abst. 101:187892m.
Fulton et al., *Structure in Medical Microbiology*, 3rd Ed., pp. 37–54, 1991.
Lattin et al., in *1993–94 Food Safety Research Progress Report*, pp. 66–70.
AN 69(05:C0205 Food Science and Technology Abstracts.
AN 89(11):C0023 Food Science and Technology Abstracts.
AN 1990:426739.
AN 1973:417711 Caplus Abstracts.
AN 1971:86344 Caplus Abstracts.
AN 1968:43156 Caplus Abstracts.
Breen et al., presented at "New Technology to Improve Food Safety" Conference (Apr. 13, 1995).
Slavik et al., in 1993–94 Food Safety Progress Report, pp. 8–12.
Salton et al., in *Medical Microbiology* 3rd Ed., Churchill Livingston, pp. 37–54, 1991.
Thomas et al. "Factors Which Affect Retention of Salmonella by Chicken Muscle Fascia" *Biofouling*, vol. 5, 1991: 75–87.

*Primary Examiner*—Peter Chin
*Attorney, Agent, or Firm*—Foley & Lardner

[57] ABSTRACT

A composition and a method of using the composition for removal and prevention of broad spectrum foodborne microbial contamination in meat products. The method uses quaternary ammonium compounds for inhibiting attachment of and removing a broad spectrum of foodborne microbial contamination from poultry and meat products. The method uses quaternary ammonium compounds for inhibiting attachment of and removing *Escherichia coli* O157:H7 contamination from meat and poultry products. One of the treatment methods is spraying quaternary ammonium compounds on the poultry and meat products to prevent broad spectrum foodborne microbial contamination. The treatment methods can contact the meat products with the quaternary ammonium compounds for less than 10 minutes and still obtain significant reduction of viable foodborne microorganisms. New formulations of quaternary ammonium compounds combined with glycerin and/or ethyl alcohol provides a concentrated formulation for industrial use and a more viscous formulation for use in spraying methods.

20 Claims, 10 Drawing Sheets

SALMONELLA TYPHIMURIUM

STAPHYLOCOCCUS AUREUS

CAMPYLOBACTER JEJUNI

ESCHERICHIA COLI

SALMONELLA TYPHIMURIUM

CAMPYLOBACTER JEJUNI

STAPHYLOCOCCUS AUREUS

ESCHERICHIA COLI

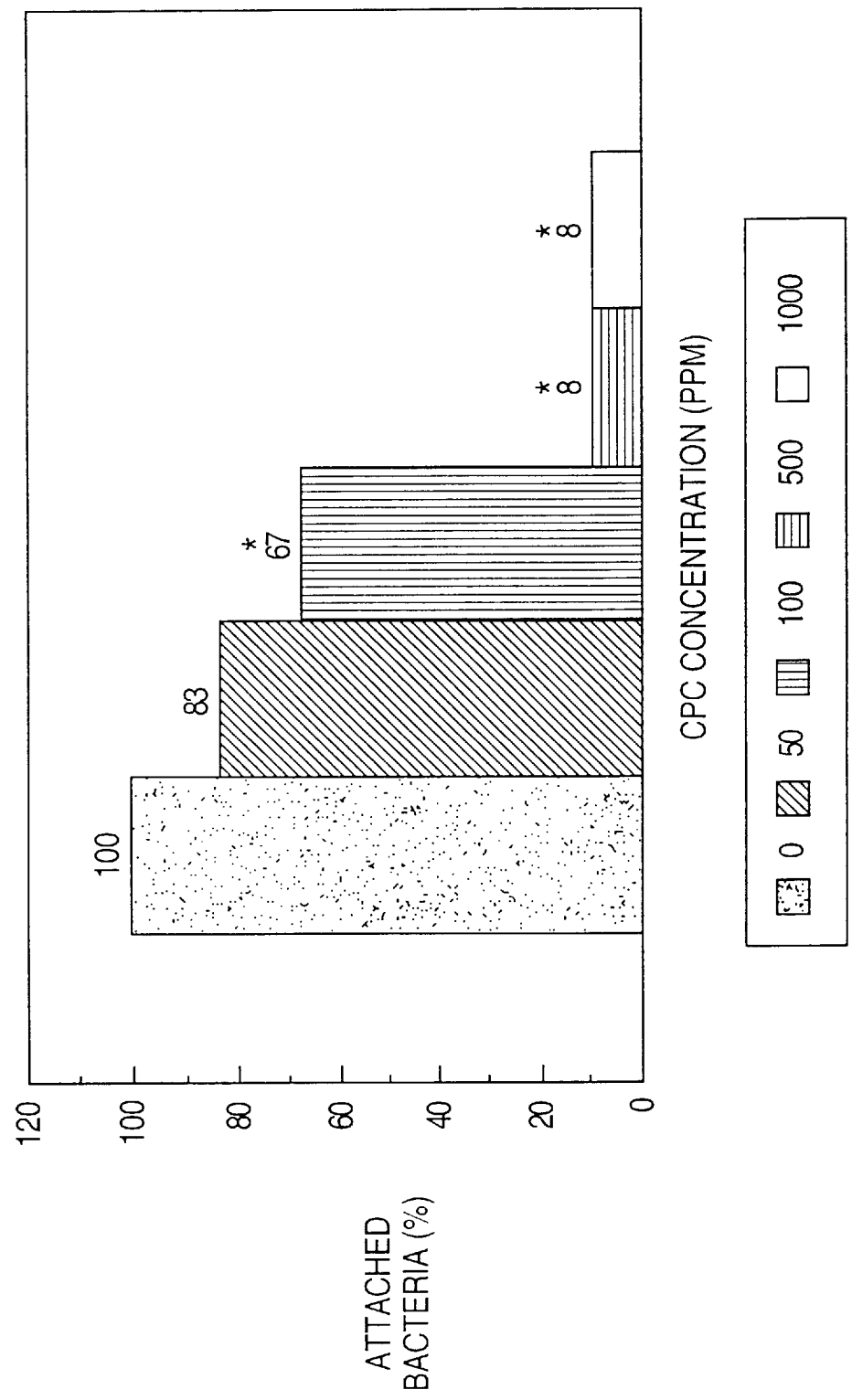

METHOD FOR THE BROAD SPECTRUM PREVENTION AND REMOVAL OF MICROBIAL CONTAMINATION OF POULTRY AND MEAT PRODUCTS BY QUATERNARY AMMONIUM COMPOUNDS

BACKGROUND OF THE INVENTION

1. Field of Invention

The present invention relates generally to a composition and a method of using the composition for removal and prevention of broad spectrum microbial contamination in meat products. More specifically, the present invention relates to a method of using quaternary ammonium compounds (QAC) for inhibiting attachment of and removing a broad spectrum of microbial contamination from poultry and meat products. More specifically, the present invention relates to a method of using QAC for inhibiting attachment of and removing pathogenic toxin-producing *Escherichia* contamination, such as *Escherichia coli* O157:H7, from meat and poultry products. More particularly, the present invention relates to an improved treatment method of spraying QAC on the poultry and meat products to prevent broad spectrum microbial contamination. The present invention also relates to new formulations of QAC including solubility and viscosity enhancing agents.

2. Description of the Prior Art

Prevention of foodborne illness by microbiological contamination is of major concern to the poultry and meat processing industry, regulatory agencies, and consumers. A recent report from the Food Safety & Inspection Service (FSIS) of the United States Department of Agriculture (Federal Register, Feb. 3, 1995) estimates that over 2 million cases of foodborne illnesses are produced annually by microbial contamination in the United States, with an associated cost of over $1 billion. In their efforts to provide a product completely free of microbial contamination, poultry and meat processors have encountered major difficulties in removing these microorganisms that adhere or attach vigorously to poultry and meat tissues intended as food products. If contaminating microorganisms do not attach to the surface of the food, they can be easily rinsed off. However, the microorganisms that become strongly attached cannot be removed by rinsing and are quite resistant to removal by chemical or physical means.

*Salmonella typhimurium* contamination has been of special concern to the poultry processing industry because the organism is often present on live birds. Poultry processors have had great difficulty in removing microorganisms such as *S. typhimurium*, that attach or adhere to poultry tissues. A variety of chemical and physical approaches have been suggested for use during poultry processing to eliminate *S. typhimurium* contamination of carcasses and minimize cross-contamination among carcasses. Trisodium phosphate (TSP) has been utilized in poultry processing for suppressing *S. typhimurium;* however, studies report conflicting results on the efficacy of TSP against Salmonella.

U.S. Pat. No. 5,366,983 discloses a method for removing or preventing Salmonella contamination of meat products by treating with an effective amount of an aqueous solution of a QAC. Specifically, quaternary ammonium cationic surfactants, such as alkylpyridinium, particularly cetylpyridinium chloride (CPC) and cetylpyridinium bromide (CPB) were effective in removing *S. typhimurium* from poultry. This patent, however, does not disclose that QAC are effective in treating meat products against any other genus of microorganisms than Salmonella.

However, foodborne illnesses caused by other pathogenic and spoilage bacteria than Salmonella have increasingly become a problem for poultry and meat processors. A list of these bacteria with the products in which they have been identified is presented in Table 1:

TABLE 1

INCIDENCE OF PATHOGENIC AND SPOILAGE BACTERIA

| Microorganism | Poultry | Beef | Pork | Pathogen | Spoilage |
|---|---|---|---|---|---|
| *Aeromonas hydrophila* | X | X | X |  | X |
| *Arcobacter butzleri* |  | X | X | X |  |
| *Bacillus cereus* | X | X | X | X |  |
| *Campylobacter jejuni* | X | X | X | X |  |
| *Escherichia coli* O157:H7 | X | X | X | X |  |
| *Listeria monocytogenes* | X | X | X | X |  |
| *Salmonella typhimurium* | X | X | X | X |  |
| *Staphylococcus aureus* | X | X | X | X |  |

Among these contaminating microorganisms listed in the table, *Escherichia coli* O157:H7 is a special concern to the meat and poultry industry because of its virulence, severity of the illness produced, and associated mortality. *E. coli* O157:H7 produces strong "shiga-like" toxins that lead to blood clotting abnormalities, kidney failure (hemolytic uremic syndrome), and death. Even if recovery from the acute illness is complete, 15–30% of infected people with hemolytic uremic syndrome will have evidence of chronic kidney disease. The risks associated with contamination with *E. coli* O157:H7 are compounded by its reported resistance to antibiotics. In 1993, between 8,000–16,000 cases of foodborne illness were produced by *E. coli* O157:H7 with an estimated cost of between 0.2 and 0.5 billion dollars.

*Listeria monocytogenes* has been found in meat, vegetables, and various milk products; and may cause sepsis, meningitis, and disseminated abscesses. *L. monocytogenes* is a cold tolerant microorganism capable of growing under refrigeration. In 1993, about 1,700 cases of foodborne illness were produced by *L. monocytogenes* with an estimated cost of between 0.1 and 0.2 billion dollars.

Another microorganism of concern in the food industry is *Aeromonas hydrophila* which causes spoilage in the food and meat processing industry and which reduces the shelf life of these products.

Presently, there is no known bactericidal compound which is effective at preventing and removing contamination in poultry and meat products against a broad spectrum of gram positive, gram negative, aerobic, facultative anaerobic, and microaerophilic microorganisms. The present inventors have discovered that QAC are effective against a broad spectrum of different microorganisms which produce foodborne illnesses. This sensitivity of a broad spectrum of pathogenic microorganisms could not have been predicted by the disclosure in U.S. Pat. No. 5,366,983 disclosing the sensitivity of only Salmonella to QAC.

Sensitivity of a microorganism against a particular antimicrobial agent is not predictive of the sensitivity of other microorganisms to the same agent. It has been believed that antiseptics or germicides have a continuous spectrum of activity but the relative susceptibilities of different microorganisms must be considered. For example, the germicide, hexachlorophene is primarily effective against Gram positive microorganisms, and cationic antiseptics are not effective against sporulating organisms. Some Gram negative microorganisms, such as *Pseudomonas cepacia,* have been known to grow in solutions of the drug, benzalkonium chloride. Other bacteria have been known to be capable of growing in 70% ethanol (Harvey, S. C., *Antimicrobial Drugs* in Remington's *Pharmaceutical Sciences*, 18th Ed., Mack Publishing Co., pp. 1163–1241 1990).

In regard to the treatment of meat products, it has been reported that Listeria is more resistant to the action of TSP than *Salmonella* or *E. coli* (Somers, E. B. et al., *Int. J. Food Microbiol.*, 22:269–276, 1994). Further, (Breen et al., *J. Food Sciences*, 60:1991–1996, 1995) demonstrated that TSP is much less effective in inhibiting Salmonella growth than it is in detaching this organism.

Most importantly, however, is the discovery that QAC are effective against *E. coli* O157:H7 in suspension in liquids, and attached to meat products as well as inhibiting the attachment of this bacteria to meat products. It has been reported that *E. coli* O157:H7 shows resistance towards broad spectrum antimicrobial agents, such as tetracycline, streptomycin, sulfisoxazole (Kim et al., *J. Infect. Dis.*, 170:1606–1609, 1994) and oxytetracycline (Ciosek et al., *Med. Weter.* 40:335,338:1984), whereas these same agents are very active against regular non-toxin-producing strains of *E. coli*.

It cannot be predicted that different antimicrobial agents or biocides will penetrate a given microorganism in the same manner as it will another microorganism. The degree of glycocalyx formation by a given species of attached bacteria, the presence of a lipopolysaccharide- and phospholipid-containing cell envelope in gram negative bacteria, the presence of lipoprotein as in most enteric bacteria and Pseudomonas, and the presence of porin protein channels, for example in *E. coli* and Salmonella, are examples of bacterial characteristics which may play a role in the effectiveness of an antimicrobial agent against a particular microorganism (Fulton et al., *Structure in Medical Microbiology*, 3rd Ed., pp. 37–54, 1991).

In summary, there is evidence that the activity of a given antimicrobial agent against a particular microorganism cannot be inferred by its activity against other microorganisms, but rather can only be determined under conditions of use. This is especially true for microorganisms which are attached to surfaces as in the case of contamination of food. The present inventors have shown that bacteria suspended in liquids are generally more susceptible to antimicrobial agents than the same bacteria attached to surfaces. As a result of increasing numbers of illnesses caused by foodborne pathogenic microorganisms, the poultry and meat processing industries now require more effective processes for the removal and prevention of a broader spectrum of microorganisms, and particularly for toxin-producing Escherichia, such as *E. coli* O157:H7, which are known to cause serious human diseases as a result of food contamination.

SUMMARY OF THE INVENTION

The present invention provides a composition and a method for the removal and prevention of a broad spectrum of microbial contamination of poultry and meat products. The microorganisms which are susceptible to the composition of the present invention include microorganisms from the genus Staphylococcus, Campylobacter, Arcobacter, Listeria, Aeromonas, Bacillus, Salmonella, non-toxin-producing Escherichia, and pathogenic toxin-producing Escherichia.

The composition of the present invention comprises an effective amount of QAC in an aqueous solution. QAC of the present invention are effective in both inhibiting attachment of a broad spectrum of pathogenic and spoilage microorganisms and removing these attached microorganisms from meat products, such as poultry and beef as well as having a bactericidal effect against the microorganisms in liquids. QAC, particularly cetylpyridinium chloride (CPC), are especially effective in the removal of attached microorganisms and the inhibiting of attachment of these organisms.

The present invention has an important application in the food processing industry, as well as for home use. QAC are readily available and the cost of carrying out the method of the present invention is not expensive as compared to existing antimicrobial processes. Unlike existing treatments using, for example, TSP, the use of QAC does not alter the appearance, color, taste, or texture of the meat product. Low concentrations of QAC are effective in removing and/or preventing broad spectrum microbial contamination of meat products. QAC are safe as shown by the lack of mutagenicity of CPC. Further, CPC is already approved for human use in products for oral ingestion in preparations, such as Cepacol® lozenges.

The present invention is also directed to a new formulation of QAC for treatment of meat products, in which for example, CPC is formulated with solubility and viscosity enhancing agents, such as glycerin and ethyl alcohol.

The present invention also is directed to an improved method of contacting meat products with QAC for a period of time of less than five minutes, even as short as one minute, which results in significant inhibition of attachment of microorganisms to the meat product.

The invention also includes an improved method of contacting QAC with meat products by spraying the compound on the meat product. The spraying method can be performed using QAC in solution in water or using the new formulation with QAC formulated with solubility and viscosity enhancing agents.

BRIEF DESCRIPTION OF THE DRAWINGS

FIG. 4 is a bar graph showing the inhibition of attachment of *E. coli* O157:H7 to chicken skin after treatment with CPC.

DETAILED DESCRIPTION OF THE INVENTION

Figure 1A:
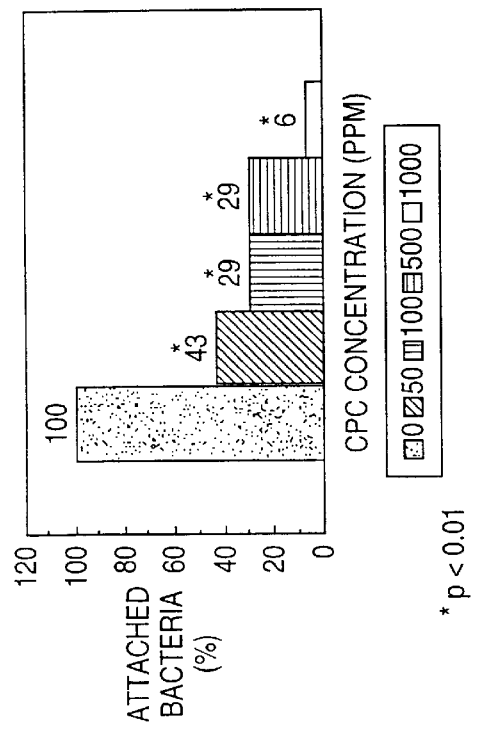
FIG. 1 is a series of bar graphs showing the reduction of several viable bacteria on chicken skin after treatment with CPC.
Figure 1B:
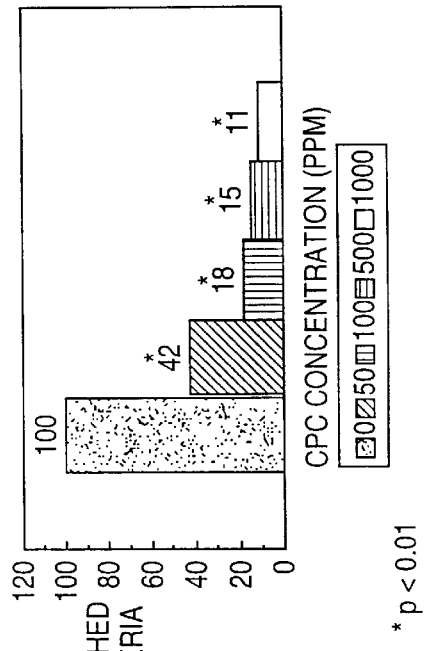
Figure 1C:
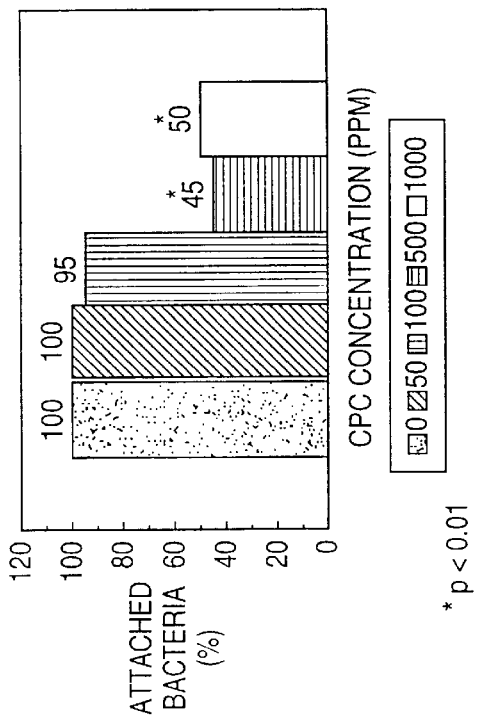
Figure 1D:
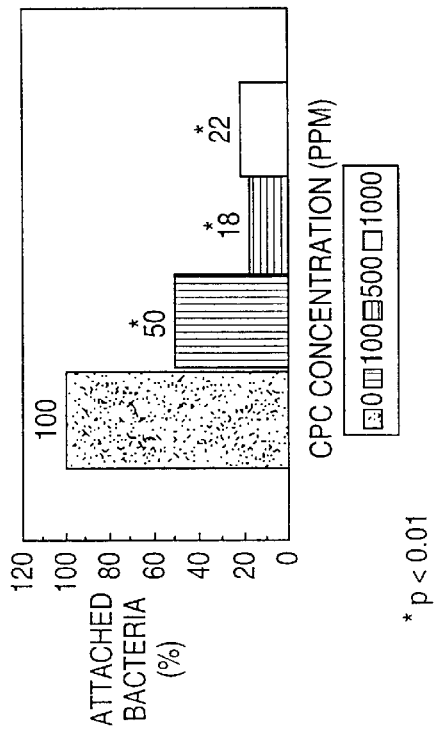

The present invention is based upon the discovery that QAC can be used to treat poultry and meat products to reduce a broader spectrum of foodborne microbial contamination on these products other than Salmonella. The present invention is also based upon the discovery that a broad range of foodborne pathogenic microorganisms belonging to the genuses, Staphylococcus, Campylobacter, Arcobacter, Listeria, Aeromonas, Bacillus, non-toxin-producing Escherichia, and the virulent toxin-producing Escherichia strains, such as E. coli O157:H7 can be removed or inhibited from attaching to meat products by treatment with QAC.

The compositions of the present invention comprises an effective amount of QAC in an aqueous solution. The QAC is selected from the group consisting of alkylpyridinium, tetraalkylammonium and alkylalicyclic ammonium salts.

Alkylpyridinium is represented by the structural formula (I):

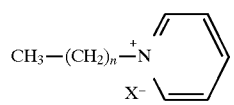

wherein n is 9–21; and X is a halide.

Tetra-alkylammonium is represented by the structural formula (II):

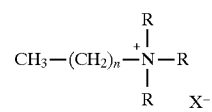

wherein n is 9–21; R is selected from the group consisting of $CH_3$ and $C_2H_5$; and X is a halide.

Alkylalicyclic ammonium salts are represented by the structural formula (III):

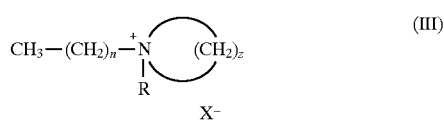

wherein n is 9–21; Z is 4–5; R is selected from the group consisting of $CH_3$ and $C_2H_5$; and X is a halide.

A variety of QAC, all of which are cationic surface-active agents; i.e., surfactants, were evaluated for their effectiveness in removing attached microorganisms from poultry tissues as well as inhibiting the attachment of the microorganisms to tissues. Of the QAC studied, cetylpyridinium chloride (CPC) was the most effective and will be utilized in the examples set forth below but it not intended to limit the QAC to CPC within the meaning of the present invention because other members of QAC also have similar properties against the foodborne pathogenic microorganisms.

The present invention is further based on the discovery that the contact time of QAC with poultry and meat products in the immersion process can be reduced to 1 minute yet still result in significant inhibition of microorganism attachment, for foodborne microorganisms including Salmonella which is a significant improvement and a commercial advantage in the industrial use of this process.

The present invention is also based on the discovery that a new method of spraying QAC under various pressures on the poultry and meat products for 30 to 90 seconds significantly reduces the viable foodborne microorganisms on these products.

The present invention is also based on the discovery that a new formulation of QAC in solutions of varying concentrations of solubility enhancing agents, such as glycerin and ethyl alcohol, allows QAC concentrations up to 1000 fold greater than if the QAC was diluted in water alone. This new formulation allows concentrated QAC to be stored and then easily diluted for use in the antimicrobial treatment process in the processing plant rather than requiring powder QAC to be mixed prior to using. This new formulation of QAC provides an easy to use concentrate which is advantageous for industrial use. This new QAC formulation can be used in both the standard immersion method or the new spraying method. When the new formulation of QAC is prepared with glycerin or other viscosity enhancing agents, and used in the spraying method, the increased viscosity of the new formulation can increase the contact time of QAC with the meat without additional steps and time to the process.

The above described aspects of the present invention are described in detail below with reference to FIGS. 1–10. The publications cited herein are hereby incorporated by reference in their entirety.

The examples set forth below serve to further illustrate the present invention in its preferred embodiments, and are not intended to limit the present invention to its preferred embodiments. The examples utilize poultry and beef tissue but it is intended that the treatment of other meat products or foods which would not be adversely affected by the treatment process are also intended to be encompassed by the present invention.

EXAMPLES

The microorganisms utilized in the following examples are as follows: Staphylococcus aureus ATCC 29213, Campylobacter jejuni ATTC 29428, Escherichia coli (non-toxin producing strain) ATCC 25922; Escherichia coli O157:H7 (toxin-producing strain) ATCC 43895, Arcobacter butzleri ATCC 49616, Listeria monocytogenes ATCC 49594, Aeromonas hydrophila ATCC 49140, Bacillus cereus ATCC 49063, and Salmonella typhimurium ATCC 14028.

Example 1

Bactericidal Activity of Quaternary Ammonium Compounds in Suspension Cultures (Not attached to meat products)

Minimum Inhibitory Concentration (MIC) of Quaternary Ammonium Compounds

Minimum inhibitory concentrations (MIC) for QAC were determined in Mueller Hinton broth (BBL Microbiology System) using the macrodilution method established by the 1987 National Committee for Clinical Laboratory Standards. Experiments were conducted by 16 hour incubation at 37° C. for Staphylococcus aureus, Escherichia coli O157:H7, Listeria monocytogenes, and Salmonella typrhimurium. For Aeromonas hydrophila, and Bacillus cereus incubations were performed at 30° C. MIC were determined by the lowest dilution with no visible turbidity. Table 2 shows the data from the above experiment:

TABLE 2

MINIMAL INHIBITORY CONCENTRATION (MIC)

| Cetylpy-<br>ridinium<br>chloride,<br>µg/mL | CPC<br>vs<br>E. coli<br>O157:H7 | CPC<br>vs B.<br>cereus | CPC<br>vs. S.<br>aureus | CPC<br>vs. S.<br>typhi-<br>murium | CPC<br>vs. A.<br>hydro-<br>phila | CPC<br>vs L.<br>monocy-<br>togens |
|---|---|---|---|---|---|---|
| 125 | − | − | − | − | − | − |
| 62.5 | − | − | − | − | − | − |
| 31.25 | − | − | − | + | + | − |
| 15.63 | − | − | − | + | + | − |
| 7.81 | + | − | − | + | + | − |
| 3.91 | + | + | − | + | + | − |
| 1.96 | + | + | − | + | + | − |
| 0.98 | + | + | − | + | + | − |
| 0.50 | + | + | − | + | + | + |
| 0.25 | + | + | − | + | + | + |
| 0.00 | + | + | + | + | + | + |

(−)No growth (+) Growth
MICs were obtained by the macrodilution broth method (National Committee for Clinical Laboratory Standards).

Minimum bactericidal concentration (MIC) of Quaternary Ammonium Compounds

Minimum bactericidal concentrations (MBC) for QAC towards *Campylobacter jejuni* and *Arcobacter butzleri* were determined in Mueller Hinton broth (BBL Microbiology System) using the macrodilution method established by the 1987 National Committee for Clinical Laboratory Standards. Experiments were conducted by microaerophilic incubation at 37° C. for 48 hours. An aliquot of each dilution was pour plated in agar and incubated in microaerophilic conditions at 37° C. for 48 hours. MBCs were determined as the lowest dilution with no growth. Table 3 shows the data from the above experiment:

TABLE 3

MINIMAL BACTERICIDAL CONCENTRATION (MBC)

| Cetylpyridinium<br>Chloride, µg/mL | CPC vs<br>Campylobacter<br>jejuni | CPC vs<br>Arcobacter<br>butzleri |
|---|---|---|
| 125 | − | − |
| 62.5 | − | − |
| 31.25 | − | + |
| 15.63 | − | + |
| 7.81 | − | + |
| 3.91 | + | + |
| 1.96 | + | + |
| 0.98 | + | + |
| 0.50 | + | + |
| 0.25 | + | + |
| 0.00 | + | + |

(−) No growth (+) Growth
MBCS were obtained by the macrodilution broth method (National Committee for Clinical Laboratory Standards).

The MIC and MBC data shows that CPC is effective against a broad range of microorganisms.

Activity of Quaternary Ammonium Compounds in Planktonic Cells

A 16-hour culture of each of *E. coli* O157:H7 in trypticase soy broth was centrifuged (15,000 rpm, 10 min, 4° C.). After removal of the supernatant, the pellet was washed with 10 ml 0.04M potassium phosphate buffer (PPB, pH 7.0), and suspended in PPB to a final suspension of $1-2 \times 10^9$ cells/ml. Aliquots (1.0 ml) were centrifuged (14,000 rpm, 3 min), and the supernatants were removed. Each pellet was suspended in either 1 ml of an aqueous solution of various concentrations (100–1,000 µg/ml) of test composition (CPC) or 1.0 ml of PPB, vortexed (30 sec), incubated for 1 min at 25° C., and centrifuged (14,000 rpm, 3 min). After removal of the supernatant, each pellet was suspended in 0.5 ml PPB. Cells from each sample were counted using duplicate 0.05 ml aliquots and standard serial dilution techniques on trypticase soy agar, and the data recorded as mean colony-forming units (CFU)/ml.

The results of the above experiment show complete reduction of viable *E. coli* O157:H7 in suspension was achieved at all concentrations of CPC tested (100, 250, 500, and 1000 µg/ml). The results of this experiment are particularly significant for the prevention of cross contamination with *E. coli* O157:H7 in industrial processing of meat. As discussed above, this strain of toxin-producing *E. coli* shows resistance to many broad spectrum antimicrobial agents. These results provide evidence that treatment of meat products with QAC will prevent one contaminated piece of meat from contaminating other uncontaminated pieces because the QAC will kill the organism in the liquid which is the transfer agent responsible for the cross contamination.

Example 2

Effects of Quaternary Ammonium Compounds on the Reduction of Viable Bacteria attached to Chicken Skin Chicken skins (2.5×2.5 cm) excised from a drumstick, sterilized by a 45 KGy dose of irradiation from an electron source, were placed epidermal side up in each well of six-well tissue culture plate. Each skin piece was inoculated with 5 ml 0.008M phosphate buffered saline (PBS, pH 7.2) containing $6-8 \times 10^3$ CFU/ml bacteria with the exception of the background control group that was treated only with 5 ml of PBS. The plates were incubated (30 min, 35° C.), and each skin piece was rinsed (2X, 5 ml PBS) to remove loosely bound (unattached) microorganisms. Each inoculated skin was treated with 5 ml of PBS containing the test compound (CPC). Three pieces of skin were used for each concentration of test compound, including one in which the skins were treated only with 5 ml of PBS (0 concentration). The plates were incubated with shaking (100 rpm) for 30 min at 25° C. After incubation, each skin piece was rinsed (5 ml PBS), placed in a sterile plastic bag containing 80 ml of saline or 1% peptone, and homogenized for 2 minutes using a laboratory blender (Stomacher 400, Seward Medical, London, England). Three aliquots of the homogenate (1 ml) were pour-plated and incubated (37° C., 18–24 hr). Bacterial colonies were counted, corrected for dilution, and reported as CFU/skin.

Figure 2:
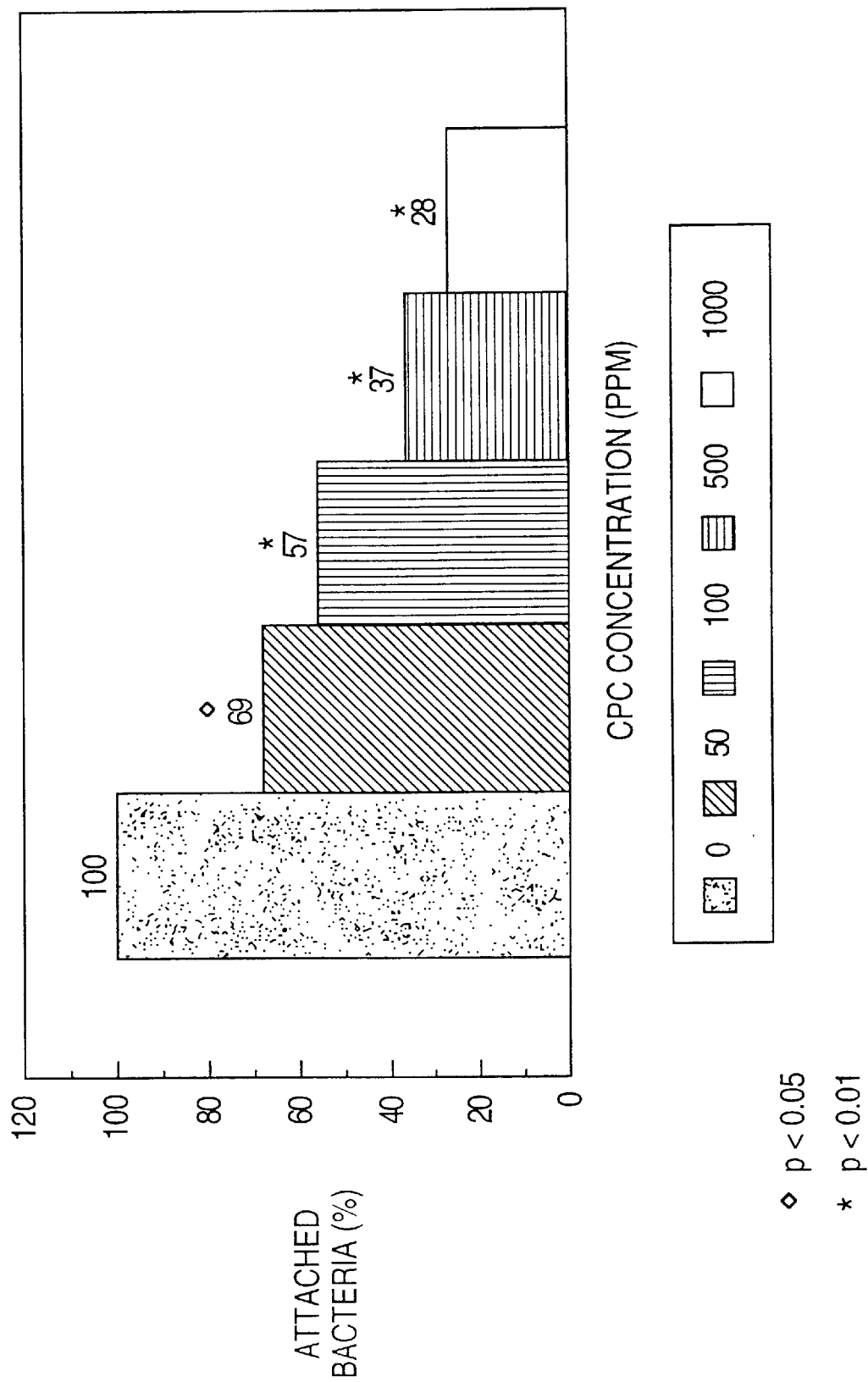
FIG. 2 is a bar graph showing the reduction of viable *E. coli* O157:H7 on chicken skin after treatment with CPC.
Figure 3A:
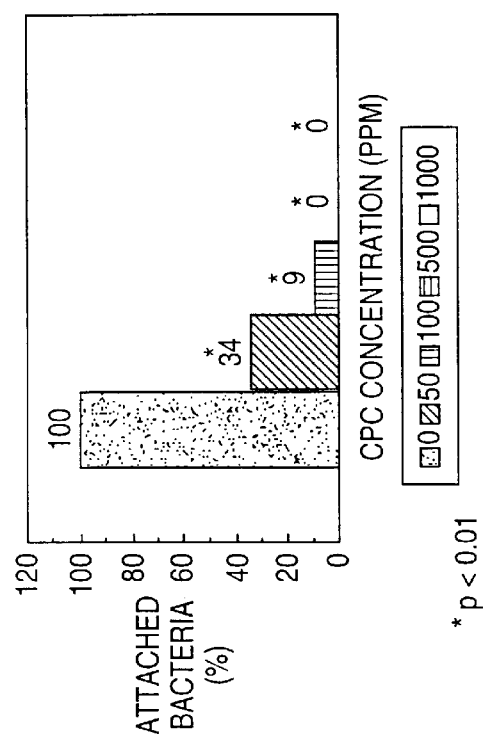
FIG. 3 is a series of bar graphs showing the inhibition of attachment of several bacteria to chicken skin after treatment with CPC.
Figure 3C:
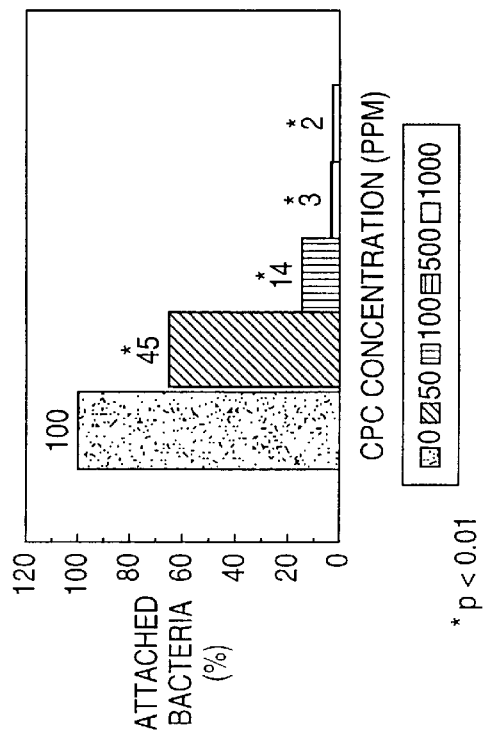
Figure 3B:
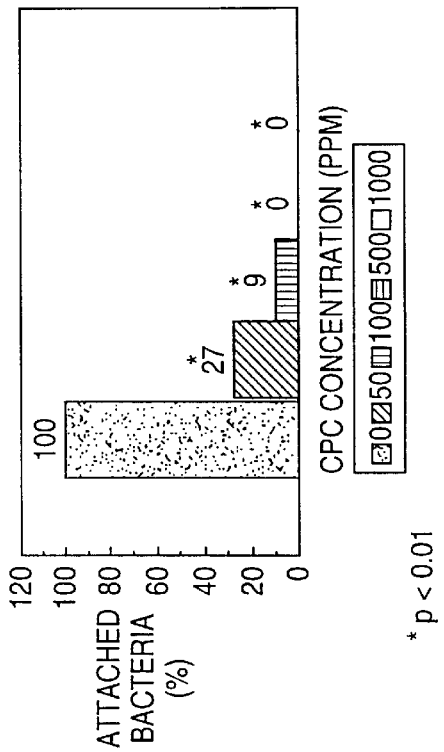
Figure 3D:
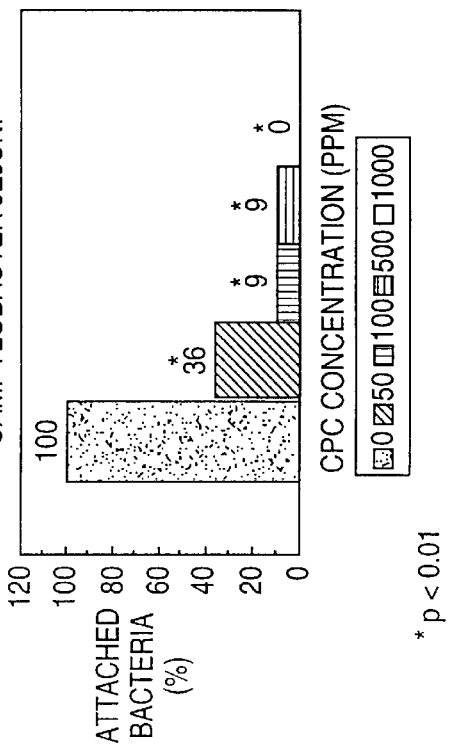

FIG. 1 shows the reduction in viable bacteria (*Salmonella typhimurium, Staphylococcus aureus, Campylobacter jejuni,* and *Escherichia coli* (non-toxin producing strain) after treatment with various concentrations of CPC. FIG. 2 shows the reduction in viable *Escherichia coli* O157:H7 after treatment with various concentrations of CPC. These figures show significant inhibition of the growth of these five bacteria on chicken skin.

Example 3

Effects of Quaternary Ammonium Compounds on the Inhibition of Bacterial Attachment to Chicken Skin Chicken skins (2.5×2.5 cm) excised from a drumstick, sterilized by a 45 KGy dose of irradiation from an electron source, were placed epidermal side up in each well of six-well tissue culture plate. Each skin piece was inoculated with 5 ml 0.008M phosphate buffered saline (PBS, pH 7.2) containing the test compound (CPC). Three pieces of skin were used for each concentration of test compound, including one in which the skins were treated only with 5 ml of PBS (0 concentration). The plates were incubated with shaking (100 rpm) for various times (1 min or 10 min) at 25° C. The incubating solution was removed by aspiration, and the skins were rinsed (5 ml PBS), and then incubated 30 min, 35° C. with 5 ml of PBS containing $6-8\times10^3$ CFU/ml bacteria. After incubation, each skin piece was rinsed (2X, 5 ml PBS), to remove loosely bound (unattached) microorganisms, placed in a sterile plastic bag containing 80 ml of saline or 1% peptone, and homogenized for 2 minutes using a laboratory blender (Stomacher 400, Seward Medical, London, England). Three aliquots of the homogenate (1 ml) were pour-plated and incubated (37° C., 18–24 hr). Bacterial colonies were counted, corrected for dilution, and reported as CFU/skin.

FIG. 3 shows the inhibition of attachment of bacteria (*Salmonella typhimurium*, *Staphylococcus aureus*, *Campylobacter jejuni*, and *Escherichia coli* (non-toxin producing strain) to chicken skin after treatment with various concentrations of CPC. FIG. 4 shows the inhibition of attachment of *Escherichia coli* O157:H7 after treatment with various concentrations of CPC. The data in these figures show that pretreating chicken skin with CPC significantly inhibits the attachment of these microorganisms to the chicken skin.

Figure 9:
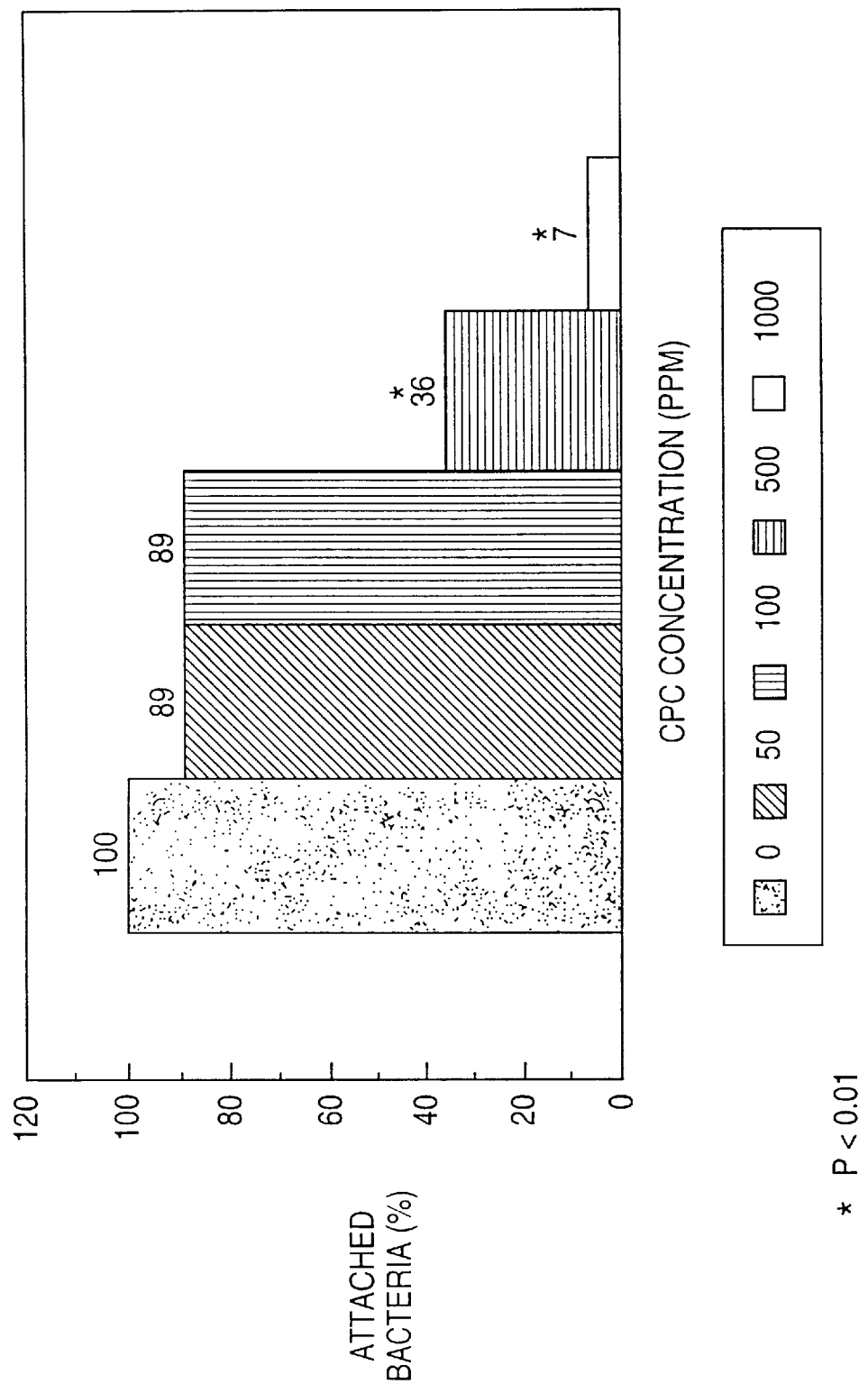
FIG. 9 is a bar graph showing the inhibition of *S. typhimurium* attachment to chicken skin after 1 minute immersion treatment with CPC.

FIG. 9 shows the results of treating chicken skin with CPC for only 1 minute where there is significant inhibition of attachment of *S. typhimurium* at 500 ppm (0.05%) and 1000 ppm (0.1%). This shorter contact time of QAC with the meat products supports using shorter contact times than has been previously reported as being effective. Generally, chill tank immersions can for up to 60 minutes but the data presented herein supports that a shorter contact or immersion time can be used which still results in significant reduction in the number of viable microorganisms.

The contacting step of the present invention can be performed for approximately 0.5 minutes to about 60 minutes; however, the present invention also discloses a method of a shorter contact time of less than 10 minutes, preferably approximately 0.5 minutes to about 9 minutes, more preferably approximately 1 minute to about 5 minutes, and most preferably approximately 1.5 minutes to about 2 minutes.

Example 4

Effects of Quaternary Ammonium Compounds on the Reduction of Viable Bacteria Attached to Beef Flank Steak Beef flank tissue squares (2.5×2.5 cm) approximately 0.5 cm thick, sterilized by a 45 KGy dose of irradiation from an electron source, were placed in each well of six-well tissue culture plate. Each tissue piece was inoculated with 5 ml 0.008M phosphate buffered saline (PBS, pH 7.2) containing $6-8\times10^3$ CFU/ml bacteria with the exception of the background control group that was treated only with 5 ml of PBS. The plates were incubated (30 min, 35° C.), and each square was rinsed (2X, 5 ml PBS) to remove loosely bound (unattached) microorganisms. The inoculated squares were treated with 5 ml of PBS containing the test compound (CPC). Three pieces of tissue were used for each concentration of test compound, including one in which the squares were treated only with 5 ml of PBS (0 concentration). The plates were incubated with shaking (100 rpm) for 30 min at 25° C. After incubation, each square was rinsed (5 ml PBS), placed in a sterile plastic bag containing 50 ml of 1% peptone, and homogenized for 2 minutes using a laboratory blender (Stomacher 400, Seward Medical, London, England). Three aliquots of the homogenate (1 ml) were pour-plated and incubated (37° C., 18–24 hr). Bacterial colonies were counted, corrected for dilution, and reported as CFU/square.

Figure 5:
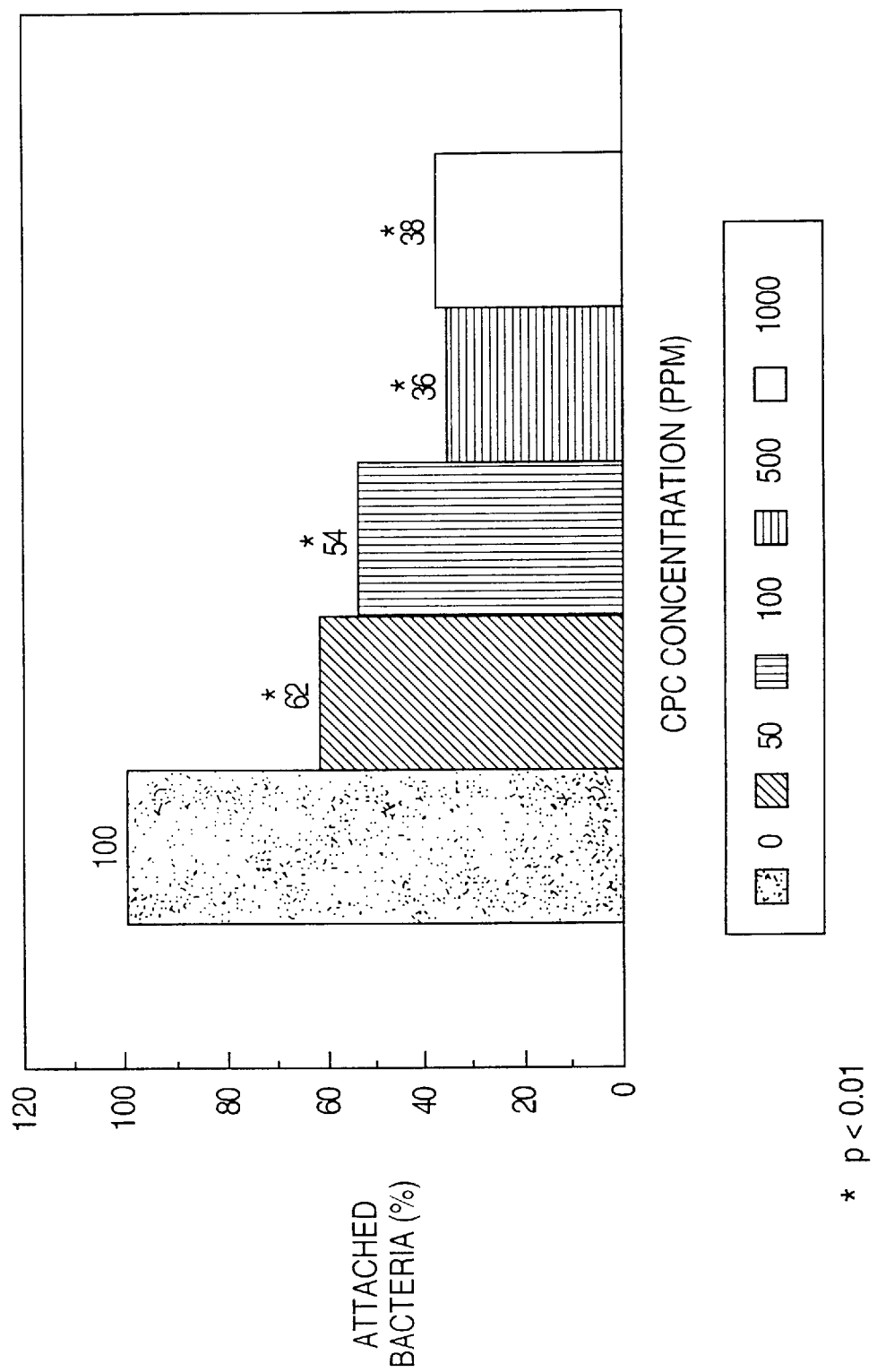
FIG. 5 is a bar graph showing the reduction of viable *E. coli* O157:H7 on beef flank tissue after treatment with CPC.

FIG. 5 shows the reduction in viable *Escherichia coli* O157:H7 after treatment with various concentrations of CPC on beef flank tissue. The results show that at concentrations between 50 ppm (0.005%) and 1000 ppm (0.1%) there was significant reduction of viable bacteria.

Example 5

Effects of Quaternary Ammonium Compounds on the Inhibition of Bacterial Attachment to Beef Flank Tissue Beef flank tissue squares (2.5×2.5 cm), approximately 0.5 cm thick, sterilized by a 45 KGy dose of irradiation from an electron source, were placed in each well of six-well tissue culture plate. Each tissue piece was treated with 5 ml 0.008M phosphate buffered saline (PBS, pH 7.2) containing the test compound (CPC). Three pieces of beef tissue were used for each concentration of test compound, including one in which the squares were treated only with 5 ml of PBS (0 concentration). The culture plates were incubated with shaking (100 rpm) for 10 minutes at 25° C. The incubating solution was removed by aspiration, and the squares were rinsed (5 ml PBS), and then incubated (30 min, 35° C.) with 5 ml of PBS containing $6-8\times10^3$ CFU/ml bacteria. After incubation, each tissue piece was rinsed (2X, 5 ml PBS), to remove loosely bound (unattached) microorganisms, placed in a sterile plastic bag containing 50 ml of 1% peptone, and homogenized for 2 minutes using a laboratory blender (Stomacher 400, Seward Medical, London, England). Three aliquots of the homogenate (1 ml) were pour-plated and incubated (37° C., 18–24 hr) Bacterial colonies were counted, corrected for dilution, and reported as CFU/square.

Figure 6:
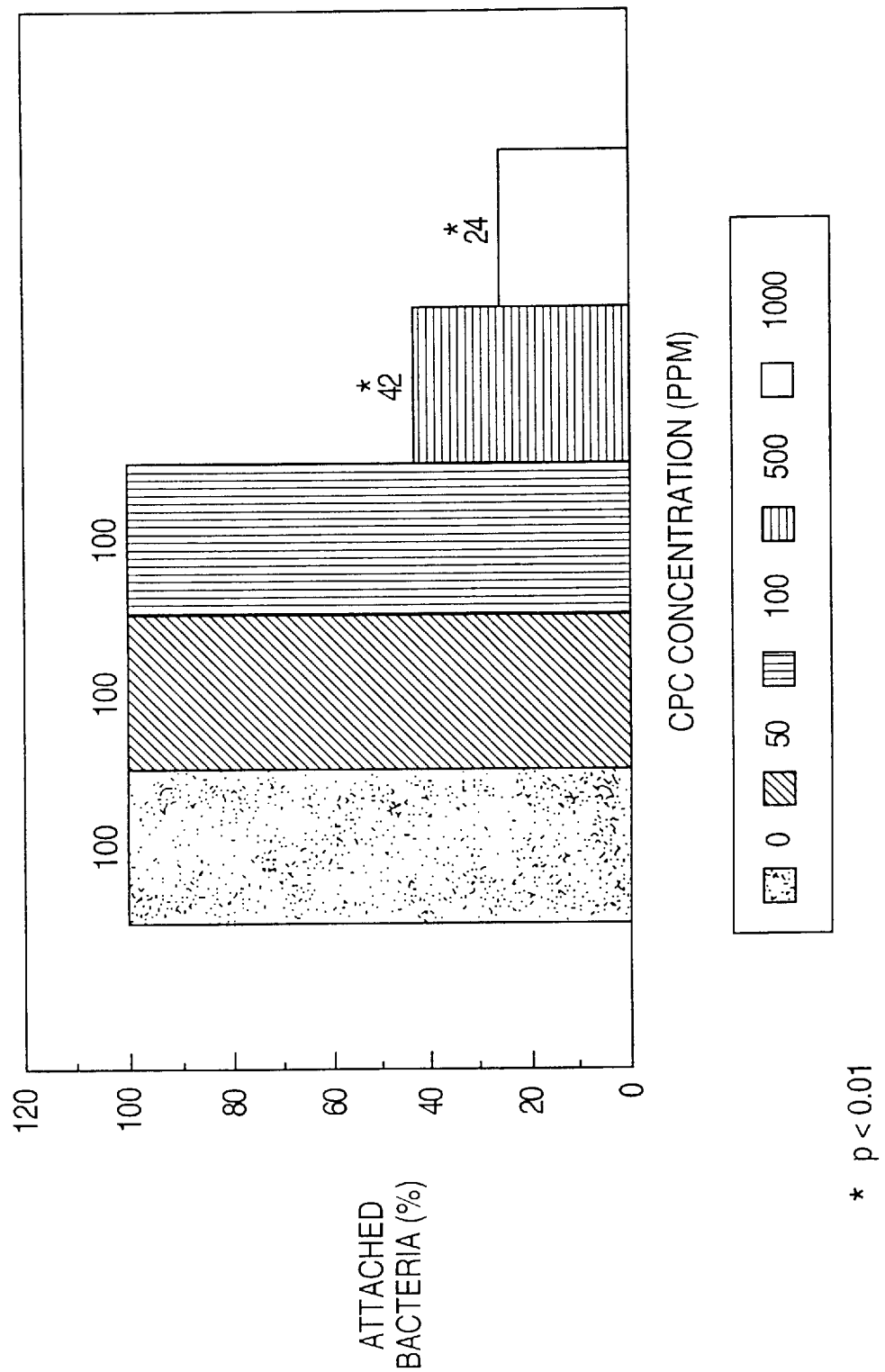
FIG. 6 is a bar graph showing the inhibition of attachment of *E. coli* O157:H7 to beef flank tissue after treatment with CPC.

FIG. 6 shows the inhibition of attachment of *Escherichia coli* O157:H7 after treatment with various concentrations of CPC. The results show that at 500 ppm (0.05%) and 1000 ppm (0.1%) there was significant inhibition of attachment of this bacteria to beef flank tissue.

Example 6

Pre-Chill Poultry Spraying With 0.1% Cetylpyridinium Chloride

Figure 10:
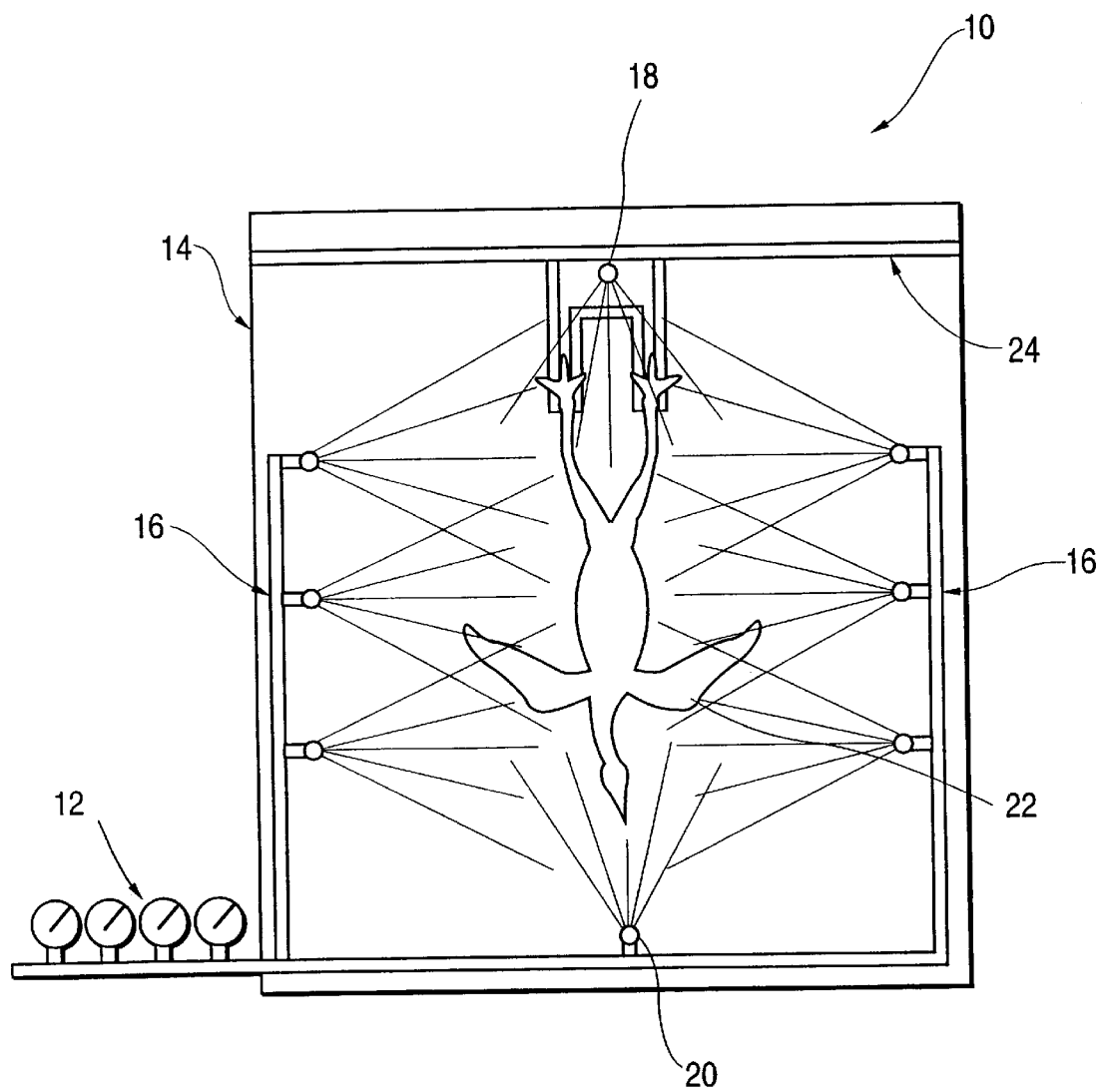
FIG. 10 is a side view of test chamber used in the spraying treatment of chicken carcasses according to the method of the present invention.

A spraying test chamber was designed and constructed for use in a poultry processing pilot plant and is shown in FIG. 10. The spraying test system consisted of a testing chamber (10), a spraying water storage tank (not shown), a pressure pump (not shown), a filter (not shown), pressure regulators (12), a plastic spraying chamber (14) with eight nozzles located on four sides, and a used water collector (not shown). There were three nozzles (16) on each of the pipes for front and back spraying. One nozzle (18) was used for top spraying and one nozzle (20) for bottom spraying. The chamber dimensions preferably are 3×3×3 feet. With a high pressure booster pump, the pressure could be adjusted between 0–140 psi. The distance between the spraying nozzles (16, 18, 20) and the chicken carcass (22) was 12–15 inches. The top nozzle (18) was used to spray the inside of the chicken carcass. Flat-cone spraying nozzles (1/8TK-SS1, Spraying Systems Co.) were used.

The spray solution in the storage tank was pumped to the pressure regulator (12), and then sprayed through the nozzles (16, 18, 20) in the chamber. In the spraying chamber (14), several spraying layers consisting of stainless steel nozzles and pipes were installed, and the chamber was covered with plastic sheets to prevent chemical drift. A shackle (24) was used to hang up a chicken carcass in the chamber.

Pre-chill chicken carcasses were obtained from a local poultry processing plant. They were taken from the end of an evisceration processing line, transported to the research laboratory, and immediately used for the tests. The time elapsed between the processing plant and the research laboratory was less than one half hour. The temperature of chicken carcasses was in the range of 32°–37° C.

Chicken carcasses were inoculated by spraying 1 ml of S. typhimurium at $1\times10^6$ CFU/ml and then incubated at room temperature for 30 min. The inoculated chicken carcasses were rinsed by spraying tap water at 30 psi and 22° C. for 5 sec. to wash off loosely attached Salmonella cells. Then each carcass was hung in the spraying chamber and sprayed with one of the test compounds. After spraying, each chicken carcass was rinsed with tap water for 20 sec. The chicken carcasses were then washed with buffered peptone water in a plastic bag on an automatic shaker to get samples for microbial analysis. The color of chicken skin was examined visually by comparing the birds treated with test compounds with untreated birds.

CPC at a concentration of 0.1% was used at different spraying pressures and durations. Spraying water temperature was set at room temperature of 22° C. Pressures were set at 30, 50, and 120 psi, and duration at 30 and 90 sec. Three replicates were performed for each trial. Reduction of S. typhimurium on chicken carcasses was compared among test compound sprayed, water sprayed, and non-sprayed groups.

After spraying treatments, each carcass was mechanically shaken with 100 ml of buffered peptone water (BPW) for 1 min, and then the wash water was collected. The samples were diluted, enriched, plated on XLT agar or Petrifilm (3M,Inc.; St. Paul, Minn. for total aerobic count plates) and incubated for 18–24 hours at 37° C. Then, colony forming units were counted. The number of attached bacteria was calculated using a most-probable-number technique. The most probable numbers of Salmonella and total aerobic plate counts were performed for each carcass using the wash water samples. An analysis of variance was used to analyze the experimental data to determine any significant differences among the treatment groups and controls (SAS/STAT User's Guide, SAS Institute, Inc., Cary, N.C. 1993).

Figure 7:
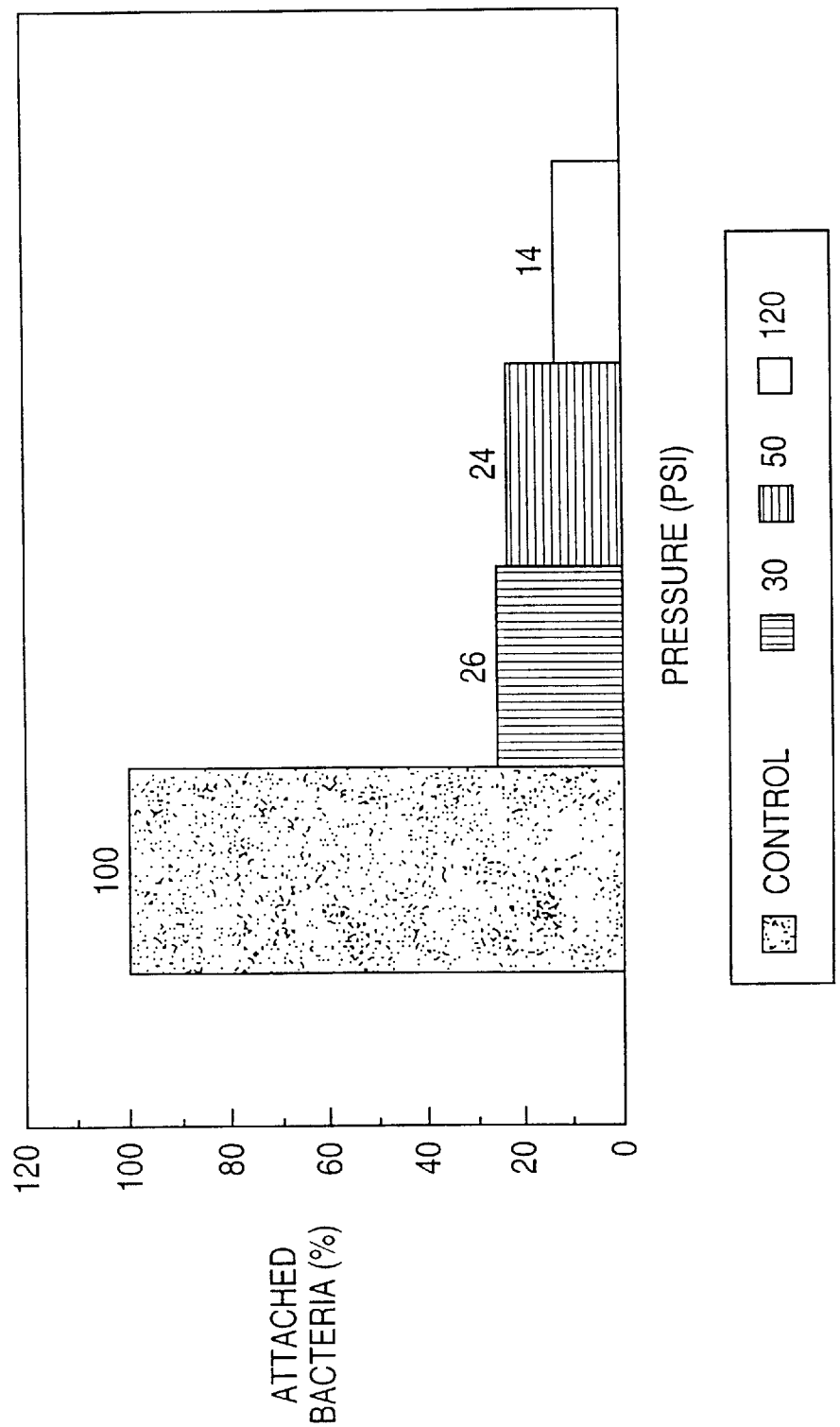
FIG. 7 is a bar graph showing the reduction of viable *S. typhimurium* on chicken carcasses after 30 seconds spraying with 0.1% CPC.
Figure 8:
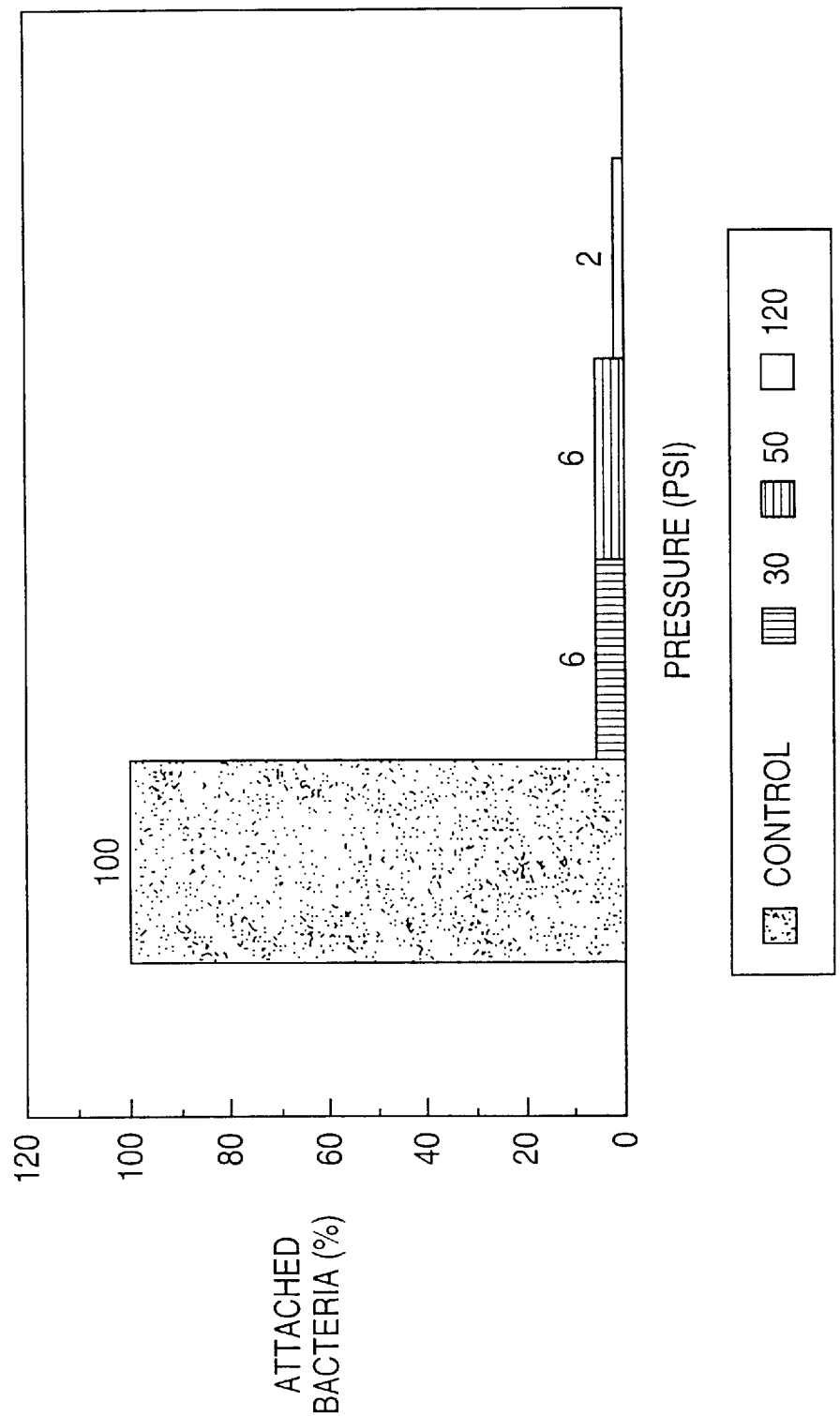
FIG. 8 is a bar graph showing the reduction of viable *S. typhimurium* on chicken carcasses after 90 seconds spraying with 0.1% CPC.

FIGS. 7 and 8 show the results of this experiment that 30 and 90 second spraying of 0.1% solution of CPC at various pressures cause a significant reduction in the number of Salmonella on chicken carcasses. This data shows that the spraying method is a viable alternate method to the standard method of immersion or dipping of chickens when sprayed for 30seconds to 90 seconds with a pressure in the range of 30 to 120 psi at 0.1% CPC concentration for . It may be possible to use lower concentrations of CPC with varying spray pressures within the disclosed range of 30 to 120 or greater psi and varying spray times to obtain the most efficient process which results in significant reduction in the foodborne microorganisms. The spraying method would be advantageous to use in industrial processes because many chicken carcasses could be sprayed automatically for short periods of time and yet result in significant reduction of pathogenic bacteria.

Formulations of Quaternary Ammonium Compounds

When using a test compound in an industrial process, it is preferable to work with only small volumes of liquid concentrates rather than large volumes of liquid solutions. A formulation of CPC has been developed that allows CPC concentrations up to 1000-fold greater than those presently available in formulation made in water alone. This formulation which contains ethyl alcohol and optionally glycerin provides a soluble concentrate for easy dilution to the final concentration for use in large scale industrial processing. This formulation contains approximately 10% to about 30% quaternary ammonium compound (CPC), approximately 0.5% to about 49% ethyl alcohol and approximately 0 to about 20% glycerin in water. A preferred formulation contains approximately 15% to about 25% quaternary ammonium compound (CPC), approximately 10% to about 40% ethyl alcohol and approximately 0.5 to about 10% glycerin in water. More preferably, the ethyl alcohol concentration can range from approximately 15% to about 30% and the glycerin concentration can range from approximately 0.5 to about 5%. Preferably, this formulation contains approximately 20% CPC, approximately 20% ethyl alcohol, and approximately 1% glycerin. This formulation is particularly useful as a concentrate to be added to the storage tanks for use in immersion treatment of meat with CPC but it could be used in a spraying method at a final concentration of approximately 0.1% CPC.

A second formulation was developed to increase the contact time of CPC solution on poultry or other food products during processing, particularly when delivered by a spraying method. This formulation allows a longer contact time of the CPC with the product without any additional steps which would increase the processing time. The formulation by virtue of its properties, such as increased viscosity, increases the antimicrobial effectiveness of the process. This formulation preferably contains approximately 0.01% to about 1.0% CPC, approximately 0 to about 10% ethyl alcohol, and approximately 0.5 to about 20% glycerin in water. More preferably this formulation contains approximately 0.05% to about 0.5% CPC, approximately 0 to about 10% ethyl alcohol, and approximately 1.0% to about 10% glycerin in water. Most preferably this formulation contains approximately 0.01% CPC, 0 to 10% ethyl alcohol, and approximately 1.0 to about 5% glycerin in water and more preferably approximately 1.0 to about 3% glycerin.

The foregoing description of the preferred embodiments of the present invention was presented for illustrative purposes and not meant to limit the invention to specific compositions used in the examples because various modifications to the disclosed invention are possible in light of the above teachings. The present invention is based upon the discovery that QAC significantly prevents and reduces bacterial contamination by a broad spectrum of foodborne microbial contamination than was previously known. The invention is intended to cover alternatives, modifications and equivalents, which may be included within the spirit and scope of the invention as defined by the appended claims.

We claim:

1. A method for reducing foodborne microbial contamination from poultry and meat products comprising:

contacting said poultry or meat product with an effective amount of a quaternary ammonium compound for about 0.5 minute to about 2 minutes to remove attached foodborne microorganisms responsible for said microbial contamination from said poultry or meat product, wherein said quaternary ammonium compound is selected from the group consisting of an alkylpyridinium salt represented by the structural formula (I):

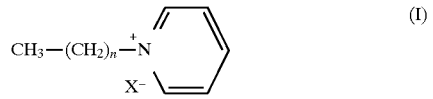

(I)

wherein n is 9–21, and X is a halide;
a tetra-alkylammonium salt represented by the structural formula (II):

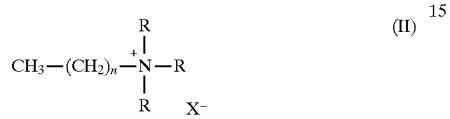

(II)

wherein n is 9–21, and R is selected from the group consisting of $CH_3$ and $C_2H_5$, and X is a halide; and
an alkylalicyclic ammonium salt represent by the structural formula (III):

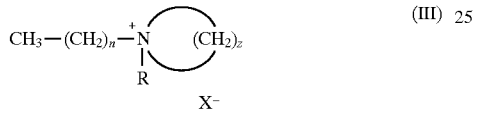

(III)

wherein n is 9–21, Z is 4–5, R is selected from the group consisting of $CH_3$ and $C_2H_5$, and X is a halide; and said foodborne microorganisms are selected from the group consisting of Salmonella, Staphylococcus, Campylobacter, Arcobacter, Listeria, Aeromonas, Bacillus, non-toxin producing Escherichia, pathogenic toxin-producing Escherichia and combinations thereof.

2. The method of claim 1, wherein said pathogenic toxin-producing Escherichia is *Escherichia coli* O157:H7.

3. The method of claim 1, wherein said quaternary ammonium compound is an alkylpyridinium salt.

4. The method of claim 3, wherein said alkylpyridinium salt is cetylpyridinium chloride.

5. The method of claim 1, wherein said effective amount of said quaternary ammonium compound is about $1\times10^{-6}$M to about $3\times10^{-2}$M.

6. The method of claim 1, wherein said contacting step comprises immersing said poultry or said meat product into said quaternary ammonium compound.

7. The method of claim 6, wherein said contacting step is performed for about 0.5 minute to about 1.5 minutes.

8. The method of claim 1, wherein said contacting step comprises spraying said poultry or said meat product with said quaternary ammonium compound.

9. A method for preventing foodborne microbial contamination of poultry and meat products comprising:
contacting said poultry or meat product with an effective amount of a quaternary ammonium compound for about 0.5 minute to about 2 minutes to inhibit the attachment of foodborne microorganisms to said poultry or meat product, wherein said microorganisms are responsible for said microbial contamination, wherein said quaternary ammonium compound is selected from the group consisting of an alkylpyridinium salt represented by the structural formula (I):

(I)

wherein n is 9–21, and X is a halide;
a tetra-alkylammonium salt represented by the structural formula (II):

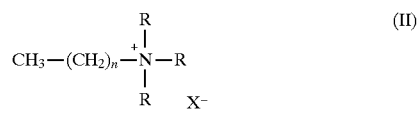

(II)

wherein n is 9–21, and R is selected from the group consisting of $CH_3$ and $C_2H_5$, and X is a halide; and
an alkylalicyclic ammonium salt represent by the structural formula (III):

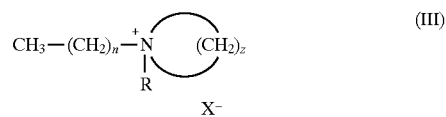

(III)

wherein n is 9–21, Z is 4–5, R is selected from the group consisting of $CH_3$ and $C_2H_5$, and X is a halide; and said foodborne microorganisms are selected from the group consisting of Salmonella, Staphylococcus, Campylobacter, Arcobacter, Listeria, Aeromonas, Bacillus, non-toxin producing Escherichia, pathogenic toxin-producing Escherichia and combinations thereof.

10. The method of claim 9, wherein said pathogenic toxin-producing Escherichia is *Escherichia coli* O157:H7.

11. The method of claim 9, wherein said quaternary ammonium compound is an alkylpyridinium salt.

12. The method of claim 11, wherein said alkylpyridinium salt is cetylpyridinium chloride.

13. The method of claim 9, wherein said effective amount of said quaternary ammonium compound is about $1\times10^{-6}$M to about $3\times10^{-2}$M.

14. The method of claim 9, wherein said contacting step comprises immersing said poultry or said meat product into said quaternary ammonium compound.

15. The method of claim 14, wherein said contacting step is performed for about 0.5 minute to about 1.5 minutes.

16. The method of claim 1, wherein said contacting step comprises spraying said poultry or said meat product with said quaternary ammonium compound.

17. The method of claim 7, wherein said contacting step is performed for about 0.5 minute to about 1 minute.

18. The method of claim 8, wherein said contacting step is performed for about 0.5 minute to about 1 minute.

19. The method of claim 15, wherein said contacting step is performed for about 0.5 minute to about 1 minute.

20. The method of claim 16, wherein said contacting step is performed for about 0.5 minute to about 1 minute.

* * * * *